US011824797B1

(12) United States Patent
Mishra et al.

(10) Patent No.: US 11,824,797 B1
(45) Date of Patent: Nov. 21, 2023

(54) METHOD FOR REDUCED PROGRAMMING OF SELECTIVE MULTICAST ROUTES IN EVPN FABRIC

(71) Applicant: Cisco Technology, Inc., San Jose, CA (US)

(72) Inventors: Mankamana P. Mishra, San Jose, CA (US); Ali Sajassi, San Ramon, CA (US); Arvind Venkateswaran, San Jose, CA (US); Jayashree Subramanian, Cary, NC (US); Patrice Brissette, Gatineau (CA); Satya Ranjan Mohanty, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 120 days.

(21) Appl. No.: 17/510,982

(22) Filed: Oct. 26, 2021

(51) Int. Cl.
*H04L 49/201* (2022.01)
*H04L 49/354* (2022.01)
(Continued)

(52) U.S. Cl.
CPC ............ *H04L 49/201* (2013.01); *H04L 45/20* (2013.01); *H04L 45/24* (2013.01); *H04L 49/354* (2013.01); *H04L 61/103* (2013.01)

(58) Field of Classification Search
CPC ....... H04L 49/201; H04L 45/20; H04L 45/24; H04L 49/354; H04L 61/103
See application file for complete search history.

(56) References Cited

U.S. PATENT DOCUMENTS

2016/0277210 A1    9/2016  Lin et al.
2018/0091420 A1*   3/2018  Drake ............... H04L 45/033
(Continued)

FOREIGN PATENT DOCUMENTS

CN      110430116 A      11/2019
WO      2017080440 A1     5/2017

OTHER PUBLICATIONS

Marques, et al., "Internal BGP as the Provider/Customer Edge Protocol for BGP/MPLS IP Virtual Private Networks (VPNs)," Internet Engineering Task Force (IETF), Request for Comments: 6368, Category: Standards Track, Sep. 2011, 14 pages.
(Continued)

*Primary Examiner* — Charles C Jiang
*Assistant Examiner* — Shawn D Miller
(74) *Attorney, Agent, or Firm* — Edell, Shapiro & Finnan, LLC

(57) ABSTRACT

At a provider edge (PE) router of PE routers of an Ethernet virtual private network (EVPN) configured to implement a border gateway protocol (BGP): receiving, from a multicast receiver, a multicast join for multicast traffic originated from a multicast source; identifying a next hop PE router for the multicast source; generating an EVPN route to the PE router, the EVPN route including an EVPN instance-route target that identifies the EVPN, and a specifically targeted route target that identifies the next hop PE router and that is configured to override the EVPN instance-route target to cause only the next hop PE router, and not any other of the PE routers, to import the EVPN route, when the EVPN route is advertised across the EVPN to the PE routers; and advertising the EVPN route across the EVPN to the PE routers.

20 Claims, 6 Drawing Sheets

(51) Int. Cl.
    *H04L 61/103*     (2022.01)
    *H04L 45/24*     (2022.01)
    *H04L 45/00*     (2022.01)

(56) References Cited

U.S. PATENT DOCUMENTS

| | | | |
|---|---|---|---|
| 2018/0331953 A1* | 11/2018 | Hoang | H04L 12/4666 |
| 2019/0132241 A1 | 5/2019 | Vattem et al. | |
| 2021/0092045 A1* | 3/2021 | Nagarajan | H04L 12/1886 |
| 2021/0099400 A1 | 4/2021 | Elizabeth et al. | |

OTHER PUBLICATIONS

Sajassi, et al., "IGMP and MLD Proxy for EVPN," draft-ietf-bess-evpn-igmp-mld-proxy-09, BESS WorkGroup, Internet-Draft, Intended status: Standards Track, Apr. 19, 2021, 34 pages.

* cited by examiner

METHOD FOR REDUCED PROGRAMMING OF SELECTIVE MULTICAST ROUTES IN EVPN FABRIC

TECHNICAL FIELD

The present disclosure relates to selective multicast route propagation in an Ethernet virtual private network (EVPN).

BACKGROUND

Service provider customers often deploy Ethernet virtual private network (EVPN) fabrics in place of virtual private local area network (LAN) service (VPLS) networks. Multicast sources and receivers can be located anywhere in the EVPN fabric, and can also be located outside of the EVPN fabric, for example, behind a gateway. A provider edge (PE) router (also referred to simply as a "PE") in the EVPN fabric may advertise an EVPN route, such as an EVPN type-6 selective multicast Ethernet tag (SMET) route (also referred to as a "multicast route") with an EVPN instance (EVI)-route target (RT) (EVI-RT) (referred to simply as an "SMET route with EVI-RT"). When the PE advertises the SMET router with EVI-RT to the EVPN fabric, the SMET route is imported by, and programmed into, each PE in the EVPN fabric that receives the advertised SMET route due to the presence of the accompanying EVI-RT. That is, the EVI-RT triggers each PE to program the SMET route locally, without qualification or filtering. Each PE programs the SMET route into forwarding/routing tables configured in local memory, which is a limited hardware resource. As the number of advertised SMET routes with EVI-RT increases, the number of SMET routes imported into and stored in each PE correspondingly increases. Many of the PEs are "source-less," meaning they do not forward multicast traffic from multicast sources to multicast receivers, and therefore have no need for the SMET routes. Nevertheless, the source-less PEs import the unneeded SMET routes with EVI-RT. This wastes the limited hardware resources in the PEs, and can cause resource overloading in the PEs, especially when the PEs are implemented as "thin" or limited-resource devices.

DESCRIPTION OF EXAMPLE EMBODIMENTS

Overview

In an embodiment, a method is performed at a provider edge (PE) router among PE routers of an Ethernet virtual private network (EVPN). The PE routers may be configured to implement the method based on a border gateway protocol (BGP), for example. The method includes receiving, from a multicast receiver, a multicast join for multicast traffic originated from a multicast source; identifying a next hop PE router for the multicast source; generating an EVPN route to the PE router, the EVPN route including an EVPN instance-route target that identifies the EVPN, and a specifically targeted route target that identifies the next hop PE router and that is configured to override the EVPN instance-route target to cause only the next hop PE router, and not any other of the PE routers, to import the EVPN route, when the EVPN route is advertised across the EVPN to the PE routers; and advertising the EVPN route across the EVPN to the PE routers.

Example Embodiments

Figure 1:
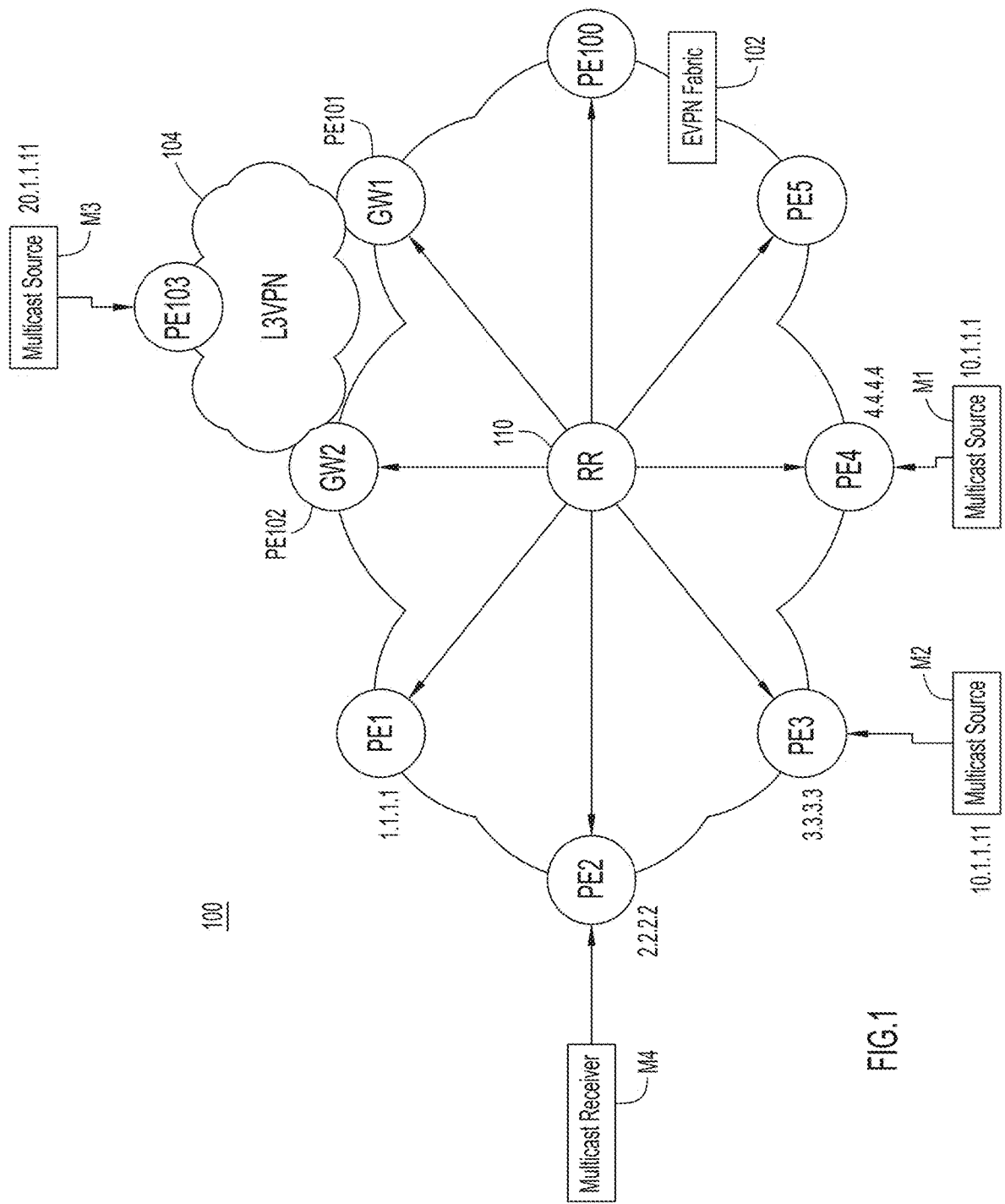
FIG. 1 is a block diagram of a network topology in which new Border Gateway Protocol (BGP) procedures that use targeted SMET routes in an EVPN for efficient/reduced programming of PEs may be implemented, according to an example embodiment.

With reference to FIG. 1, there is a block diagram of an example network topology 100 in which new BGP procedures for an EVPN that employ targeted SMET routes (also referred to as targeted "multicast routes") for efficient programming of PE routers may be implemented. Network topology 100 includes an EVPN fabric or simply "EVPN" 102 coupled to a layer 3 (L3) network 104. EVPN 102 includes PE routers PE1-PE100, PE routers PE101 and PE102 (also referred to as gateways (GWs) "GW1" and "GW2") that serve as respective gateways from the EVPN to L3 network 104, and a route reflector (RR) 110 connected to the PE routers. L3 network 104 includes an L3VPN PE router PE103. The PE routers may each include a network device, such as a router or switch, and may be a hardware device, or a virtual device (e.g., an application hosted on a server). The PE routers PE1, PE2, PE3, and so on, are assigned IP addresses 1.1.1.1, 2.2.2.2, 3.3.3.3, and so on, that identify the PE routers and may serve as next hop addresses for forwarding of multicast traffic, as described below. The PE routers forward traffic to each other in/over their respective networks. Such traffic includes data packets and messages, which may be forwarded using network communication protocols, such as, but not limited to, the Transmission Control Protocol/Internet Protocol (TCP/IP), User Datagram Protocol (UDP), and the like. While only a small number of PE routers are shown, thousands of such PE routers may be present in a typical EVPN or L3 network. In the ensuing description, a given PE router PEi may be referred to simply as "PEi."

Network topology 100 includes multicast ("mcast") sources M1, M2, and M3 connected to PE4, PE3, and PE103, respectively, and a multicast receiver M4 connected to PE2. A multicast source includes a host device or computer (referred to simply as a "host") that originates multicast traffic, and a multicast receiver includes a host that receives multicast traffic. Multicast sources M1 and M2 are configured with a local IP subnet corresponding to EVPN 102, i.e., both of the multicast sources are on the local IP subnet for the EVPN. In the example, multicast sources M1 and M2 have respective IP addresses 10.1.1.1 and 10.1.1.11, and are said to "sit behind" EVPN 102. Similarly, multicast receiver M4 sits behind EVPN 102. In contrast, multicast source M3 has IP address 20.1.1.11 corresponding to L3 network 104, and is not on the local IP subnet for EVPN 102. Multicast source M3 is said to "sit behind" gateways GW1, GW2, and L3 network 104.

PE1-PE102 participate in Border Gateway Protocol (BGP) sessions, such as through RR 110. Thus, multicast traffic forwarding information (such as BGP routes) may be learned, in part, through message exchanges, e.g., BGP route advertisements sent, between the PEs and RR 110, during the BGP sessions. The multicast traffic forwarding information may also be configured on PE1-PE102, in part, by an administrator. The multicast traffic forwarding information, RR 110, the BGP sessions, and related messages, such as BGP advertisements, and the like, collectively represent a BGP control plane that generates and disseminates control plane information for use by PE1-PE102, as described herein. Based on the multicast traffic forwarding information, the PEs of EVPN 102 may forward traffic from one or more multicast sources to one or more multicast receivers.

Conventional BGP procedures can lead to unneeded programming of local resources and thus memory overloading in the PEs, as is demonstrated by the following example described in connection with FIG. 1. Assume (i) PE2 receives, from multicast receiver M4, a local multicast join (e.g., Internet Group Management Protocol (IGMP) join) to receive multicast traffic from multicast source M1 sitting behind PE4, and (ii) that selective multicast is enabled on PE2. Under conventional BGP procedures, PE2 converts the multicast join to an EVPN route, i.e., a SMET route to PE2 (the last hop PE for multicast traffic from PE M1) with EVI-RT. The EVI-RT is carried in a BGP Extended Community (EC), and identifies EVPN 102.

The tables below show some of the fields in the SMET route and its accompanying EVI-RT EC.

| SMET Route |
| --- |
| route distinguisher (RD) |
| Ethernet segment identifier (ESI) |
| multicast source length |
| multicast source address (e.g., for M1) |
| multicast group length |
| multicast group address |
| originator router length |
| originator address (e.g., last hop PE2 address) |

| EVI-RT EC | | |
| --- | --- | --- |
| Type (indicates EVI-RT) | subtype | RT associated with EVI |
| RT associated with EVI (continued) | | |

The SMET route may be referred to as a "SMET route to/for the last hop PE," (e.g., to PE2). PE2 advertises the SMET route with EVI-RT to other PEs in EVPN 102 via RR 110. Because of the presence of the EVI-RT, all other PEs accept/import the SMET route and program the SMET route into their local memories, even though only PE4 actually needs or will use the SMET route because multicast source M1 only sits behind PE4. The problem scales with the number of PEs and multicast joins. For example, when 100 PEs send 1000 EVPN/SMET routes responsive to 1000 IGMP joins, propagation of the SMET routes through a route reflector results in 100,000 EVPN/SMET routes bring programmed in each PE, which is typically beyond the storage capacity of each PE.

Accordingly, embodiments presented herein introduce new BGP procedures implemented by the PEs in an EVPN and that are configured to reduce unnecessary SMET route programming in the PEs. In part, the new BGP procedures add a new BGP/EVPN EC to a conventional SMET route with EVI-RT. The new EC transforms the conventional SMET route with EVI-RT into a specifically targeted SMET route. The new EC carries an RT specifically targeted only to a PE that actually needs the SMET route, i.e., only to the "next hop" PE behind which a multicast source sits. The presence of the new EC carrying the specifically targeted RT triggers only the next hop PE that is specifically targeted to program the SMET route into local memory, while all other PEs to which the SMET route is not specifically targeted simply drop the route. That is, the new EC essentially overrides the normal effect of the EVI-RT on the other PEs. Other features and advantages of the embodiments presented herein are described below.

The new BGP procedures may be configured on each PE in the EVPN to cause a given PE to (i) generate and advertise a specifically targeted SMET route (referred to as an "outbound SMET route") responsive to a multicast join, and (ii) processes a specifically targeted SMET route (referred to as an "inbound SMET route") that is received by the given PE. The new BGP procedures may be configured with export and import BGP policy rules to implement the logic described below with respect to outbound SMET routes and inbound SMET routes, respectively.

The embodiments presented herein include the following possible use cases associated with multicast joins:

a. Source-specific multicast (SSM) (S, G) joins where the multicast source is sitting in the EVPN, where "S" denotes a multicast IP source address, and "G" denotes a multicast IP group address.

b. SSM (S, G) joins where the multicast source is sitting behind an L3 network via one or more gateway PEs of the EVPN.

c. Any-source multicast (ASM) (*, G) joins where the multicast source can be at any location, e.g., in the EVPN, or in the L3 network.

Figure 2:
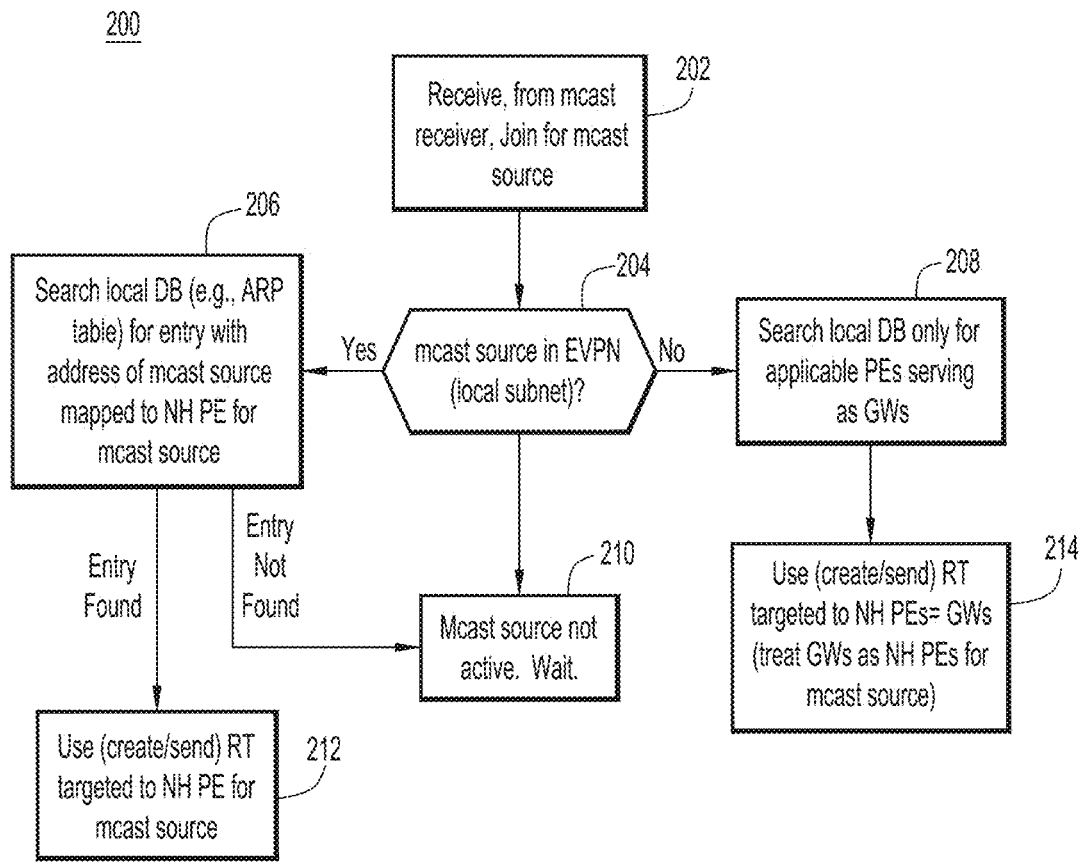
FIG. 2 is a high-level flowchart of a method of using a specifically targeted SMET route in an EVPN responsive to a source-specific multicast (SSM) join (S, G), according to an example embodiment.

With reference to FIG. 2, there is a high-level flowchart of an example method 200 of using a specifically targeted SMET route in an EVPN (e.g., EVPN 102) including multiple PEs in which the new BGP procedures are implemented. In the method, an SSM join from a multicast source (e.g., multicast source M1) sitting in the EVPN triggers operations 206, 210, and 212, while an SSM join from a multicast source sitting behind an L3 network (e.g., L3 network 104) triggers operations 208 and 214, as will be described below. The method is described with continued reference to FIG. 1.

At 202, a PE (e.g., PE1) in the EVPN receives, from a multicast receiver (e.g., M4) connected to the PE, a multicast join (e.g., an IGMP join) for multicast traffic originated from a multicast source (e.g., M1) identified in the multicast join. The PE that receives the multicast join is referred to as a "last hop" PE for the multicast traffic.

At 204, the PE determines whether the multicast source is in the EVPN, e.g., whether the multicast source is in a local IP subnet for the EVPN. When the multicast source is in the local IP subnet, flow proceeds to 206. When the multicast source is not in the local IP subnet, flow proceeds to 208.

At 206, the PE searches an existing local database (DB) (e.g., an address resolution protocol (ARP) table) for an ARP entry that maps the multicast source (e.g., M1) to a next hop PE (e.g., PE4) in the EVPN for the multicast source. The next hop PE is the PE behind which the multicast source is sitting. When the ARP entry is not found, indicating that the multicast source is silent/not active, flow proceeds to 210, where the PE waits. Alternatively, when the ARP entry is found, the PE identifies the next hop PE for the multicast source based on the ARP entry, and flow proceeds to 212.

At 212, the PE generates/creates an EVPN route as a SMET route for the PE that is specifically targeted to the next hop PE (e.g., PE4) for the multicast source (e.g., M1). The SMET route for the PE includes (i) an EC that includes an EVI-RT that identifies the EVPN, and (ii) a new EC that includes an RT specifically targeted to, and that identifies, only the next hop PE.

The following table shows an example new EC, referred to as a "specifically targeted RT EC":

| New EC ("Specifically Targeted RT EC") | | |
|---|---|---|
| Type (indicates specifically targeted RT) | subtype | specifically targeted RT for next hop PE |
| specifically targeted RT for next hop PE (continued) | | |

The specifically targeted RT in the new EC is configured to override the EVI-RT to cause only the next hop PE, and not any of the other PEs in the EVPN, to import the SMET route for the PE, when the SMET route is advertised across the EVPN. In summary, the PE generates the SMET route with an EC for the EVI-RT and a new EC for the specifically targeted RT.

Then, the PE advertises the SMET route (including the ECs mentioned above) to all of the PEs in the EVPN, via RR 110. Due to the presence of the new EC for the specifically targeted RT, that identifies only the next hop PE, only the next hop PE imports the EVPN route for the PE. All other PEs in the EVPN drop the EVPN route.

When the multicast source is not in the local IP subnet for the EVPN, at 208, the PE searches the existing local database (e.g., a gateway table) for entries that indicate which of the PEs in the EVPN serve as gateways from the EVPN to an L3 network (e.g., L3 network 104). The PE identifies the gateway PEs (e.g., GW1, GW2) found in the search as next hop PEs for the multicast source, because the multicast source is sitting behind the gateway PEs. Flow proceeds to 214.

At 214, the PE generates/creates a SMET route (to the PE) that is targeted to each of the next hop PEs (i.e., in this case, the gateway PEs) for the multicast source. Specifically, the SMET route includes (i) an EC that includes an EVI-RT that identifies the EVPN, and (ii) for the gateway PEs, new ECs that respectively include RTs specifically targeted to the gateway PEs. As discussed above, the RTs in the new ECs that are specifically targeted to the gateway PEs are configured to override the effect of the EVI-RT to cause only the gateway PEs, and not any other PEs, to import the SMET route, when the SMET route is advertised across the EVPN to the PE routers.

Then, the PE advertises the SMET route to the other PEs in the EVPN, via RR 110. Due to the presence of the new ECs carrying specifically targeted RTs that identify the corresponding gateway PEs, only the gateway PEs import the SMET route. All other PEs in the EVPN (that are not the gateway PEs) drop the EVPN route.

Figure 3:
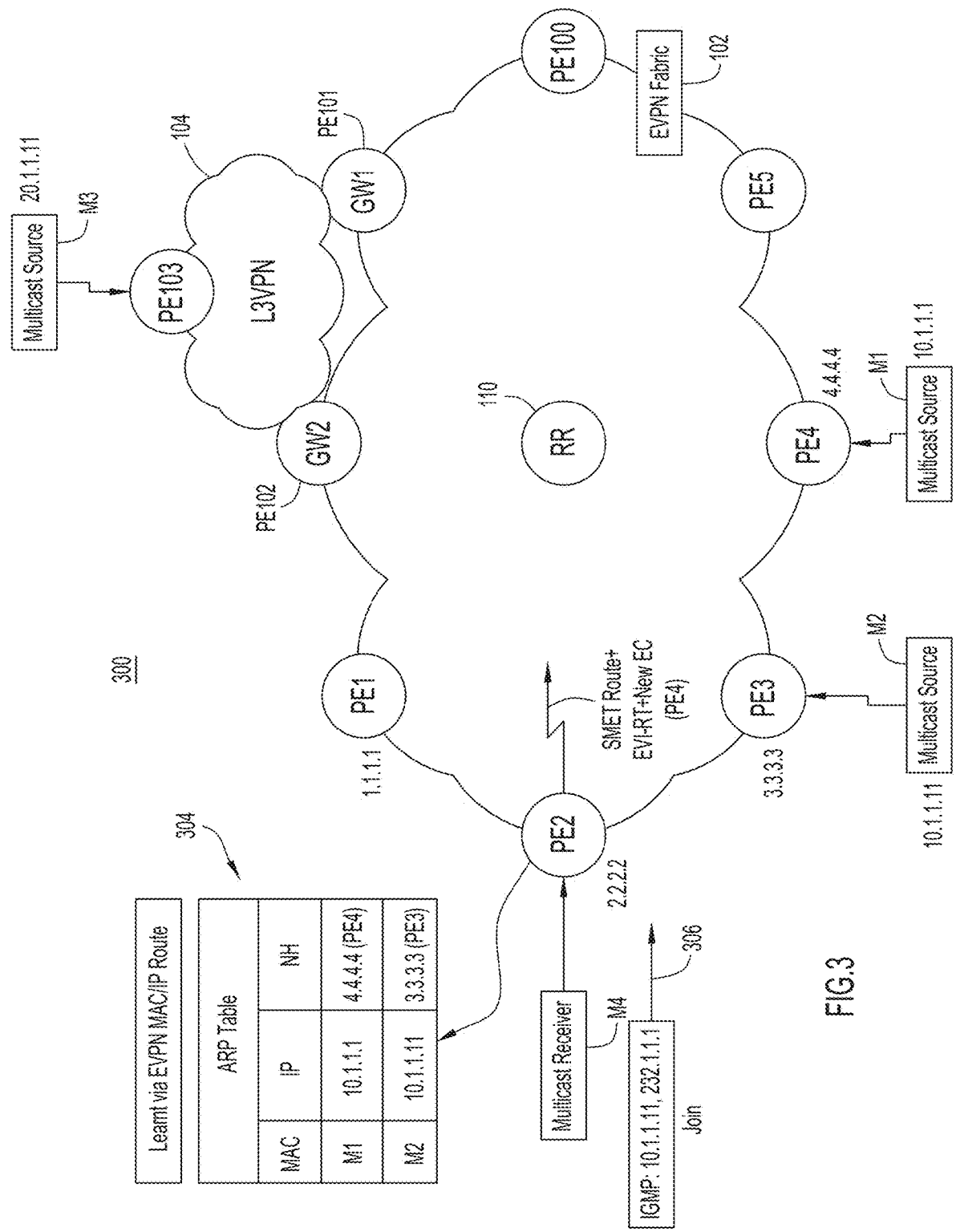
FIG. 3 is an illustration of using a specifically targeted SMET route in an EVPN triggered in response to an SSM join (S, G) from a multicast source sitting in the EVPN, according to an example embodiment.

With reference to FIG. 3, there is an illustration of an example 300 of using a specifically targeted SMET route in EVPN 102 triggered in response to an SSM join from a multicast source sitting in the EVPN. The example of FIG. 3 provides details expanding on operations 206, 210, and 212 of method 200.

Initially, when new hosts (i.e., multicast sources and receivers) are learnt in EVPN 102 (e.g., when hosts first connect to the PEs in the EVPN), the EVPN employs an EVPN procedure, based on the ARP, for example, that originates media access control (MAC)/IP routes to ensure each PE in the EVPN is aware of how to reach the hosts, i.e., to reach the IP addresses of the hosts. For example, when host M1 (IP address 10.1.1.1) behind PE4 and host M2 (IP address 10.1.1.11) behind PE3 are learnt by each PE, the EVPN procedure ensures that each PE constructs/populates a local ARP table 304 having entries or mappings (e.g., rows) for hosts M1, M2 that map their MAC addresses (first column) to their IP addresses (second column) and to their next hop IP addresses (third column). For example, ARP table 304 maps the MAC address for host M1 to its IP address 10.1.1.1 and to a next hop address 4.4.4.4 for PE4 (i.e., to next hop PE4), behind which the host sits. Thus, the mappings (e.g., rows) of ARP table 304 may be searched using an IP address/MAC address of a host to find the next hop for the host.

After the new hosts are learnt, at 306, lasts hop PE2 receives an IGMP join (S, G)=(10.1.1.11, 232.1.1.1) to receive multicast traffic from multicast source M2 sitting behind PE3. The IGMP join includes IP source address=10.1.1.11 for multicast source M2. In response to receiving the join:
  a. PE2 determines whether multicast source M2 is in the local IP subnet for EVPN 102 based on the IP address of multicast source M2 that is provided in the IGMP join. In this case, multicast source M2 is in the local IP subnet.
  b. Since multicast source M2 is in the local IP subnet, PE2 searches ARP table 304 for a next hop PE for multicast source M2, and finds next hop PE3 (NH 3.3.3.3).
  c. PE2 creates a SMET route leading to PE2 with (i) a first EC including the EVI-RT and (ii) as second (new) EC including an RT specifically targeted to, and identifying, next hop PE3 (NH 3.3.3.3).
  d. PE2 sends a BGP advertisement to all of the PEs in EVPN 102 with the SMET route, including both ECs.
  e. The SMET route is accepted/imported only by PE3 and discarded by all other PEs due to the presence of the specifically targeted RT in the new EC that identifies only next hop PE3. For example, the PEs are each pre-configured with a new BGP policy rule that triggers importation of the SMET route with EVI-RT and with the specifically targeted RT only by a PE having an identity that matches the identity in the specifically targeted RT.

Figure 4:
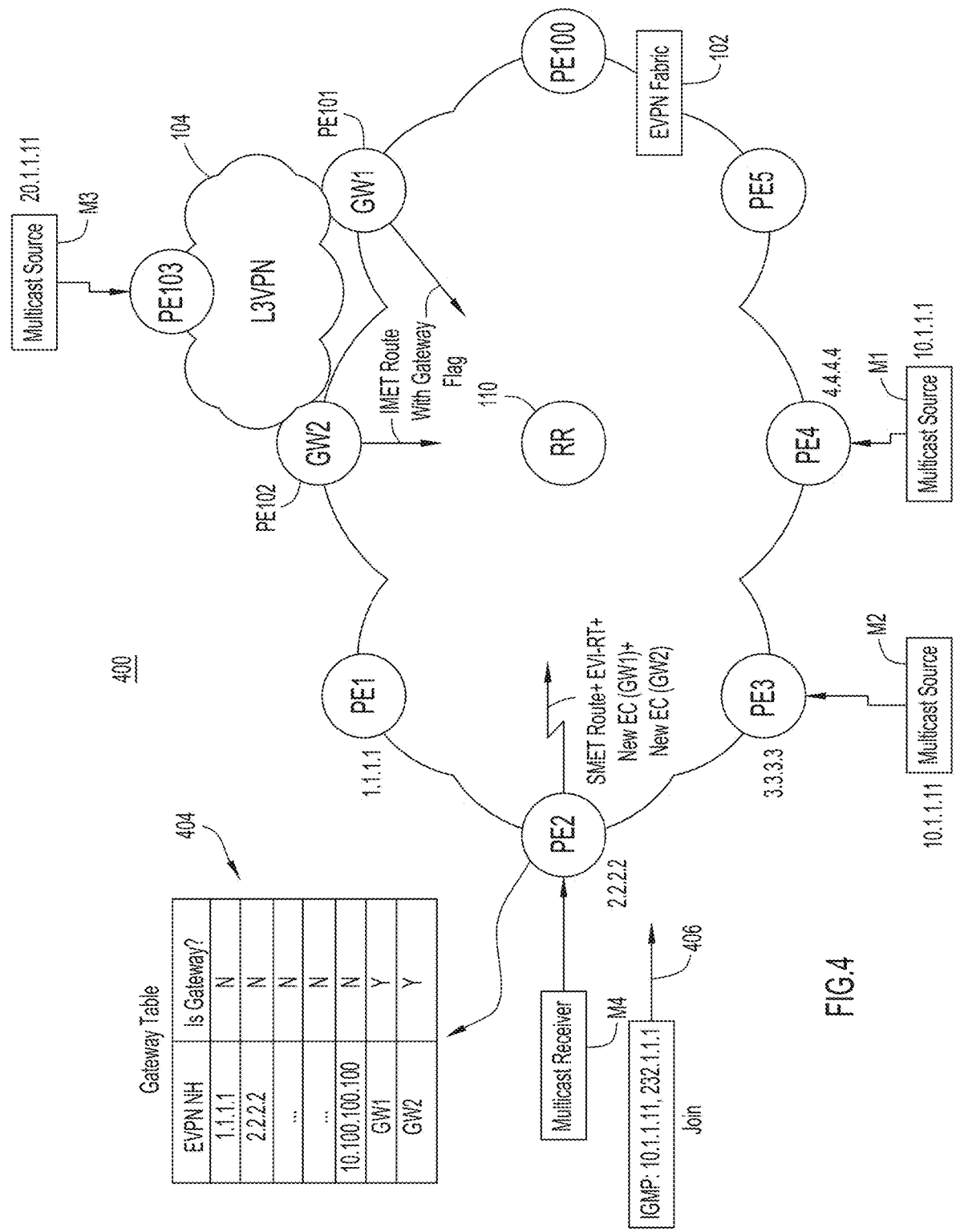
FIG. 4 is an illustration of using a specifically targeted SMET route in an EVPN triggered in response to an SSM join (S, G) from a multicast source sitting outside of the EVPN in a layer 3 network, according to an example embodiment.

With reference to FIG. 4, there is an illustration of an example 400 of using a specifically targeted SMET route in EVPN 102 triggered in response to an SSM join from a multicast source sitting in L3 network 104 behind gateways GW1, GW2. The example of FIG. 4 provides details expanding on operations 208 and 214 of method 200.

Initially, EVPN 102 employs an EVPN procedure to identify particular PEs that serve as gateways to L3 network 104. A given PE may serve as a gateway when a bridge domain is configured on a multicast router port of the given PE. Also, a given PE may serve as a gateway when the PE is configured with an integrated routing and bridging (IRB)

interface or has any other layer 2 (L2) port connected to an L3 router. Thus, the EVPN procedure may rely on IGMP snooping to detect/track the presence of any multicast router ports on a given PE that indicate the PE serves as a gateway. When a given PE is detected as being a gateway, that PE generates, and advertises to other PEs of EVPN 102, an inclusive multicast Ethernet tag (IMET) route (referred to as a BGP type 3 route), extended, according to embodiments presented herein, to include a new EC having a gateway flag set to indicate that the PE serves as a gateway (i.e., by which the PE identifies itself as a gateway). The new EC having the gateway flag is different from the new EC that includes the specifically targeted RT, described above. Each PE that serves as a gateway advertises the IMET route with the gateway flag set to indicate the PE is a gateway.

Each PE in EVPN 102 that receives the advertised IMETs routes with the gateway flag constructs/populates a local gateway table 404 having entries (e.g., rows) for PEs in EVPN 102. The entries map identities of the PEs (indicated as next hop IP addresses of the PEs in the first column) to Yes (Y)/No (N) flags (in the second column) that indicate whether the PEs serve as gateways or do not serve as gateways. For example, gateway table 404 indicates next hop PE1 with address 1.1.1.1 is not a gateway, but that GW1 (PE101) and GW2 (PE102) are gateways. It is understood that gateway table 404 is shown by way of example, only, and that the information in the gateway table may be stored in different data structures. Each PE constructs instances of gateway table 404 and ARP table 304 (described in connection with FIG. 3), which are collectively referred to as a "local database" stored in each PE.

After gateway table 404 has been constructed, at 406, PE2 receives an IGMP join (S, G)=(20.1.1.11, 232.1.1.1) to receive multicast traffic from multicast source M3 sitting behind PE103 in L3 network 104. The IGMP join includes IP source address=20.1.1.11 for multicast source M3. In response to receiving the join:
  a. PE2 determines whether multicast source M3 is in the local IP subnet for EVPN 102 based on the IP address of multicast source M3 that is provided in the IGMP join. In this case, multicast source M3 is not in the local IP subnet.
  b. Since multicast source M3 is not in the local IP subnet, PE2 searches gateway table 404 for next hop gateways in the bridge domain, and finds two gateways GW1 and GW2.
  c. PE2 creates a type 6 SMET route to PE2 with:
    i. EVI-RT in an EC.
    ii. a new EC (EC1) including a specifically targeted RT for GW1.
    iii. a new EC (EC2) including a specifically targeted RT for GW2.
  The SMET route may be denoted: "SMET route with EVI-RT+EC1 for GW1+EC2 for GW2."
  d. PE2 sends a BGP advertisement to all of the PEs in EVPN 102 with the SMET route with EVI-RT+EC1 for GW1+EC2 for GW2.
  e. The SMET route is accepted/imported only by GW1 and GW2 and discarded by all other PEs in EVPN 102 due to the presence of the specifically targeted RTs in the two new ECs that identify only GW1 and GW2.

Another embodiment (referred to as the "ASM embodiment") handles ASM (*, G) joins for which the multicast source can be at any location, such as in the EVPN or in the L3 network. For the ASM embodiment, all of the PEs in the EVPN that are known to possibly serve as next hops for multicast sources may be pre-configured with an additional new ASM BGP policy rule that triggers importation of an SMET route with EVI-RT and that also includes a new "ASM" EC configured with a predetermined RT for ASM joins. The following table shows an example ASM EC:

| ASM EC | | |
| --- | --- | --- |
| Type (indicates ASM EC) | subtype | Predetermined RT |
| Predetermined RT (continued) | | |

The predetermined RT may include a predetermined IP address that is not used in the local IP subnet, e.g., IP address=100.1.1.1. Any of the PEs that are configured with the new BGP policy rule will import an SMET route with EVI-RT and with the ASM EC with RT for ASM, while PEs that are not configured with the new ASM BGP policy rule will not import the SMET route.

Similarly, PEs (e.g., last hop PEs) that may receive an ASM (*, G) join are configured with a new ASM BGP policy rule to generate the SMET route with EVI-RT and with the ASM EC with RT for ASM, and to advertise the SMET route, upon receipt of the ASM (*, G) join.

Assuming the PEs are configured with the above-mentioned new BGP ASM rules, the ASM embodiment may include the following operations:
  a. A host sends local IGMP (*, G) join to a last hop PE.
  b. Once received at the last hop PE, the last hop PE checks the join for an IP source address. Since there is no IP source address in the join, the PE originates an SMET route with EVI-RT and with an ASM EC with the predetermined RT.
  c. Only PEs configured with the new ASM BGP policy will import the SMET route.

In summary, a PE in an EVPN receives, from a multicast receiver connected to the PE, a multicast join for multicast traffic originated from a multicast source. Upon determining that the multicast join is an any-source multicast (ASM) join in which a source address is not specified, the PE generates an EVPN route as an SMET route to the PE router. The EVPN route includes an EVI-RT in a first EC and a predetermined ASM RT in a second EC (i.e., an ASM EC). The predetermined ASM RT specifies a predetermined IP address that is on a different subnet from the IP subnet of the EVPN, or some other unique identifier not otherwise used in the EVPN. The PE advertises the EVPN route. Only PEs in the EVPN that are next hops (or possibly next hops) for multicast sources are pre-programmed to recognize and import the EVPN route with the ASM EC. Other PEs do not recognize and import the EVPN route with the ASM EC.

Figure 5:
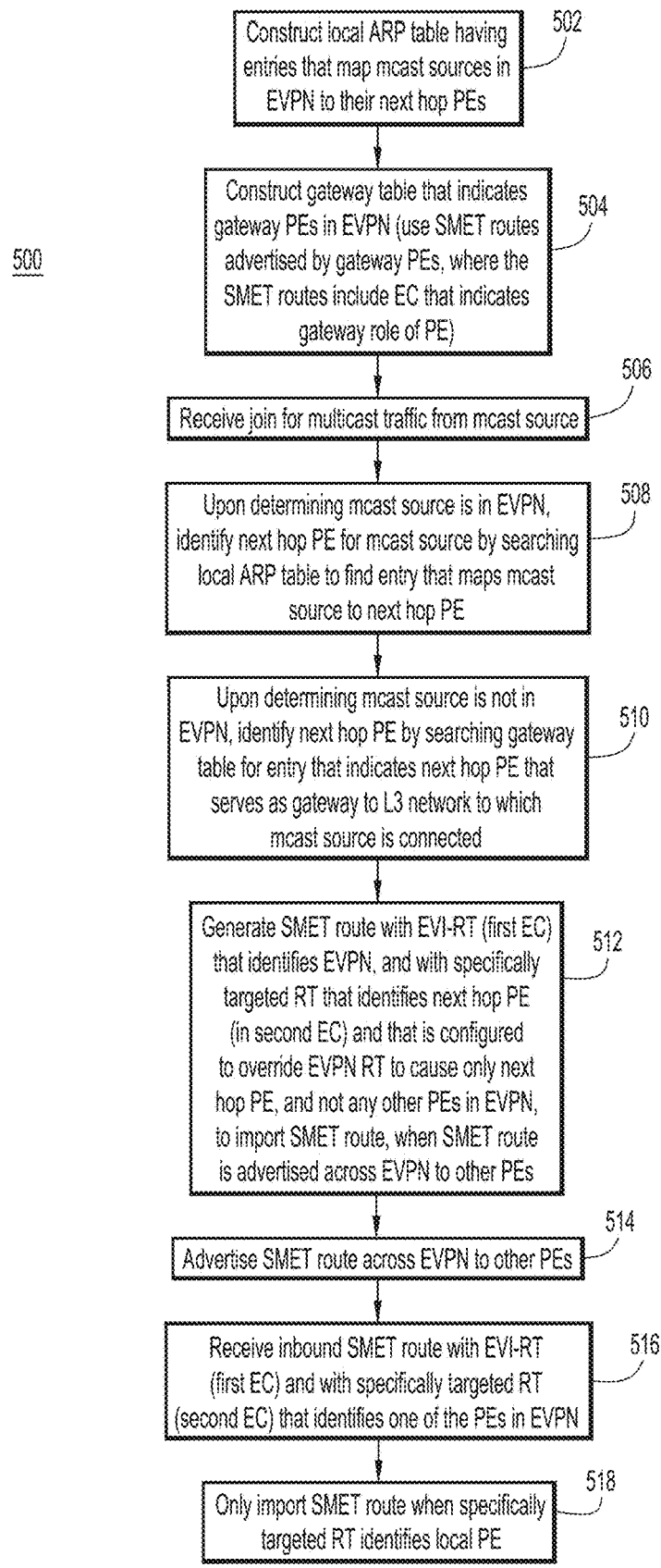
FIG. 5 is a flowchart of another method of using a specifically targeted SMET route for efficient/reduced programming of PEs in an EVPN, according to an example embodiment.

With reference to FIG. 5, there is a flowchart of an example method 500 of using a specifically targeted SMET route for efficient programming of PE routers in an EVPN. Method 500 includes operations described above.

At 502, a PE router among the PE routers executes/participates in an ARP discovery process across the EVPN, and populates/constructs an ARP table in a local database (i.e., a database stored in memory of the PE router). The ARP table includes entries that map hosts (e.g., multicast sources) to identifiers of their next hop PE routers.

At 504, the PE router constructs a gateway table in the local database. The gateway table indicates which PE routers in the EVPN serve as gateways to an L3 network. To do this, the PE router may receive, from PE routers that serves as the gateways, IMET routes having a new EC that indicates the gateway role of the sending PE router. The PE router constructs the gateway table based on the received IMET routes.

At 506, the PE router receives, from a multicast receiver connected to the PE router, a multicast join (S, G) for multicast traffic originated from a multicast source. The PE router is considered a last hop PE router for the multicast traffic. The PE router performs next operations 508-518 responsive to receiving the join.

At 508, upon determining that the multicast source is in the EVPN based on the IP address of the multicast source expressed in the join, the PE router identifies the next hop PE router by searching for, and finding, an ARP entry in the ARP table constructed prior to 508 that maps the multicast source to the next hop PE router.

At 510, upon determining that the multicast source is not in the EVPN, the PE router identifies the next hop PE router by searching for, and finding, an entry in the gateway table that indicates the next hop PE router serves as a gateway to an L3 network to which the multicast source is connected. The PE router may identify one or more PE routers that serve as gateway PE routers.

At 512, the PE router generates/creates an EVPN route to the PE router. In an example, the SMET route is an EVPN type 6 SMET route with an EVI-RT that identifies the EVPN (in a first EC), and with a specifically targeted RT that identifies the next hop PE router (in a second EC). The specifically targeted RT in the second EC is configured to override the EVI-RT to cause only the next hop PE router, and not any other of the PE routers, to import the SMET route, when the SMET route is advertised across the EVPN to the PE routers.

At 514, the PE router advertises the EVPN route across the EVPN to the other PE routers. Due to the presence of the specifically targeted RT that identifies only the next hop router, only the next hop router imports and programs the SMET route in local memory, e.g., in forwarding/routing tables.

At 516, the PE router receives an inbound SMET route (here, the term "inbound" means "received") to a particular PE among the PEs, with EVI-RT (first EC), and with a specifically targeted RT (second EC) that identifies one of the PE routers in the EVPN.

At 518, the PE router only imports the inbound SMET route when the specifically targeted RT identifies the PE router, i.e., when the specifically targeted RT is targeted to the PE router.

Figure 6:
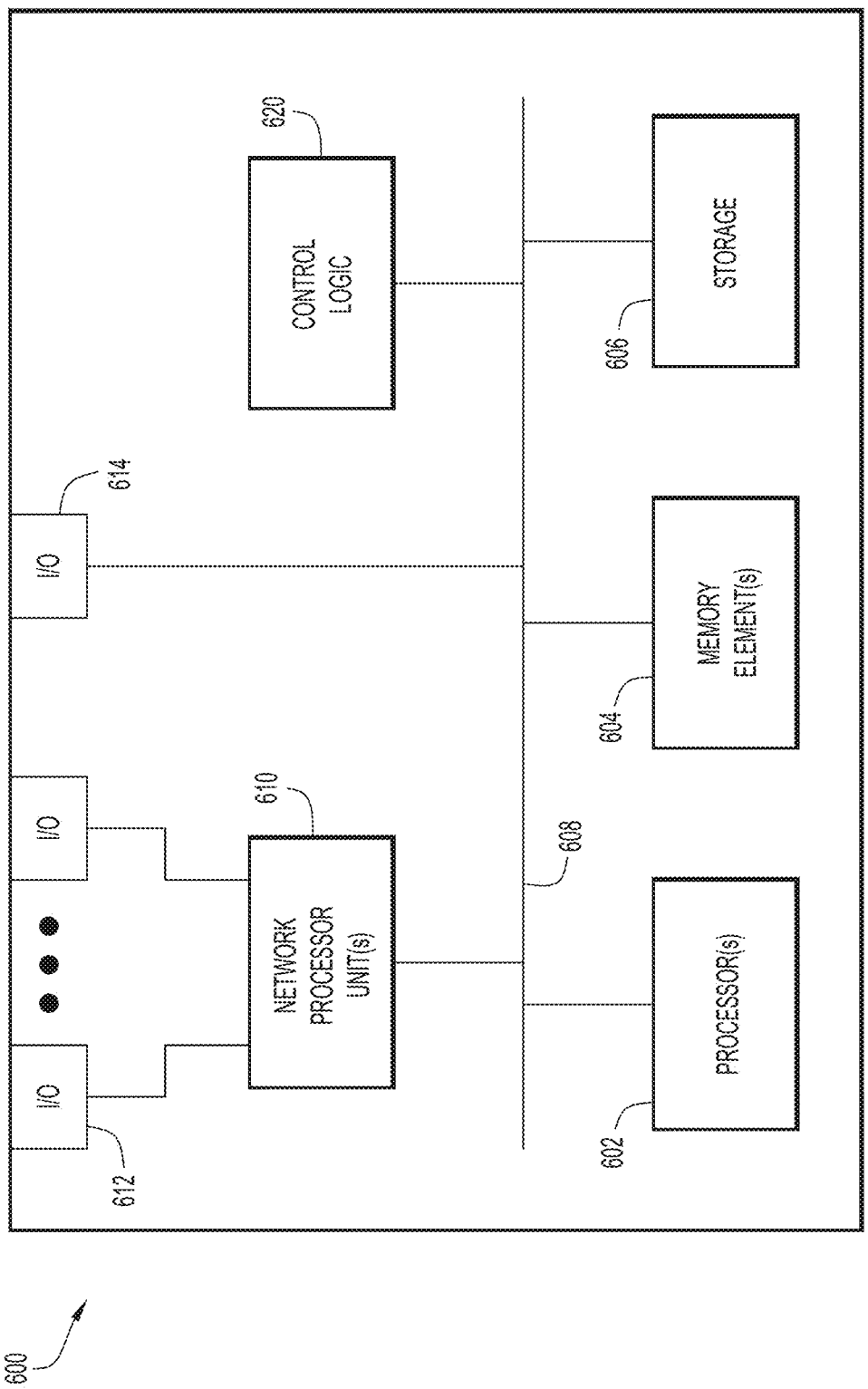
FIG. 6 illustrates a hardware block diagram of a computing device that may perform operations to implement the embodiments presented herein, according to an example embodiment.

Referring to FIG. 6, FIG. 6 illustrates a hardware block diagram of a computing device 600 that may perform functions associated with operations discussed herein in connection with the techniques depicted in FIGS. 2-5. In various embodiments, a computing device or apparatus, such as computing device 600 or any combination of computing devices 600, may be configured as any entity/entities as discussed for the techniques depicted in connection with FIGS. 2-5 in order to perform operations of the various techniques discussed herein. Computing device 600 may represents a PE router, for example.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/ transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/ antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, routers, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, the embodiments presented herein include mechanisms to restrict EVPN route propagation to only those PEs who forward traffic from a multicast source. The embodiments may use an ARP table entry to identify the source location. The embodiments provide a way to achieve higher scaling of route propagation with low-end PE routers in a network.

In one aspect, a method is provided comprising: at a provider edge (PE) router of PE routers of an Ethernet virtual private network (EVPN): receiving, from a multicast receiver, a multicast join for multicast traffic originated from a multicast source; identifying a next hop PE router for the multicast source; generating an EVPN route to the PE router, the EVPN route including an EVPN instance-route target that identifies the EVPN, and a specifically targeted route target that identifies the next hop PE router and that is configured to override the EVPN instance-route target to cause only the next hop PE router, and not any other of the PE routers, to import the EVPN route, when the EVPN route is advertised across the EVPN to the PE routers; and advertising the EVPN route across the EVPN to the PE routers.

In another aspect, an apparatus is provided comprising: a network input/output interface to communicate with a network; and a processor of a provider edge (PE) router of PE routers of an Ethernet virtual private network (EVPN), the processor coupled to the network input/output interface and configured to perform: receiving, from a multicast receiver, a multicast join for multicast traffic originated from a multicast source; identifying a next hop PE router for the multicast source; generating an EVPN route to the PE router, the EVPN route including an EVPN instance-route target that identifies the EVPN, and a specifically targeted route target that identifies the next hop PE router and that is configured to override the EVPN instance-route target to cause only the next hop PE router, and not any other of the PE routers, to import the EVPN route, when the EVPN route is advertised across the EVPN to the PE routers; and advertising the EVPN route across the EVPN to the PE routers.

In another aspect, a non-transitory computer readable storage medium encoded with instructions is provided. The instructions, when executed by a processor of a provider edge (PE) router of PE routers of an Ethernet virtual private network (EVPN), cause the processor to perform: receiving, from a multicast receiver connected to the PE router, a multicast join for multicast traffic originated from a multicast source; identifying a next hop PE router for the multicast source; generating an EVPN route to the PE router, the EVPN route including an EVPN instance-route target that identifies the EVPN, and a specifically targeted route target that identifies the next hop PE router and that is configured to override the EVPN instance-route target to cause only the next hop PE router, and not any other of the PE routers, to import the EVPN route, when the EVPN route is advertised across the EVPN to the PE routers; and advertising the EVPN route across the EVPN to the PE routers.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a provider edge (PE) router (PE router) of PE routers of an Ethernet virtual private network (EVPN):
receiving, from a multicast receiver, a multicast join for multicast traffic originated from a multicast source;
identifying a next hop PE router for the multicast source;
generating an EVPN route to the PE router, the EVPN route including a first extended community that is an EVPN instance-route target that identifies the EVPN, and a second extended community that is a specifically targeted route target that identifies the next hop PE router and that is configured to override the EVPN instance-route target to cause only the next hop PE router, and not any other of the PE routers, to import the EVPN route, when the EVPN route is advertised across the EVPN to the PE routers; and
advertising the EVPN route across the EVPN to the PE routers.

2. The method of claim 1, wherein:
the EVPN route includes an EVPN type-6 selective multicast Ethernet tag (SMET) route.

3. The method of claim 1, further comprising:
upon determining that the multicast source is in the EVPN, identifying includes, finding, in a local database, an address resolution protocol (ARP) entry (ARP entry) that maps the multicast source to the next hop PE router.

4. The method of claim 3, further comprising:
prior to identifying, executing an ARP discovery process across the EVPN to populate the local database with ARP entries, including the ARP entry.

5. The method of claim 1, further comprising:
upon determining that the multicast source is not in the EVPN, identifying includes, finding, in a local database, an entry that indicates the next hop PE router serves as a gateway to a layer 3 (L3) network (L3 network) to which the multicast source is connected.

6. The method of claim 5, further comprising, prior to identifying:
upon receiving, from the next hop PE router, an indication that the next hop PE router serves as the gateway to the L3 network, populating the local database with the entry that indicates the next hop PE router serves as the gateway.

7. The method of claim 6, wherein:
receiving, from the next hop PE router, the indication includes receiving, from the next hop PE router, an inclusive multicast Ethernet (IMET) route (IMET route) that includes the indication in an extended community of the IMET route.

8. The method of claim 1, wherein receiving includes receiving the multicast join to include an Internet group management protocol (IGMP) join.

9. The method of claim 1, further comprising:
receiving, from a particular PE router among the PE routers, an inbound EVPN route to the particular PE router, wherein the inbound EVPN route includes a second EVPN instance-route target that identifies the EVPN, and a second specifically targeted route target that identifies one of the PE routers; and
only importing the inbound EVPN route when the second specifically targeted route target identifies the PE router.

10. An apparatus comprising:
a network input/output interface to communicate with a network; and
a processor of a provider edge (PE) router (PE router) of PE routers of an Ethernet virtual private network (EVPN), the processor coupled to the network input/output interface and configured to perform:
receiving, from a multicast receiver, a multicast join for multicast traffic originated from a multicast source;
identifying a next hop PE router for the multicast source;
generating an EVPN route to the PE router, the EVPN route including a first extended community that is an EVPN instance-route target that identifies the EVPN, and a second extended community that is a specifically targeted route target that identifies the next hop PE router and that is configured to override the EVPN instance-route target to cause only the next hop PE router, and not any other of the PE routers, to import the EVPN route, when the EVPN route is advertised across the EVPN to the PE routers; and
advertising the EVPN route across the EVPN to the PE routers.

11. The apparatus of claim 10, wherein:
the EVPN route includes an EVPN type-6 selective multicast Ethernet tag (SMET) route.

12. The apparatus of claim 10, wherein the processor is further configured to perform:
upon determining that the multicast source is in the EVPN, identifying includes, finding, in a local database, an address resolution protocol (ARP) entry (ARP entry) that maps the multicast source to the next hop PE router.

13. The apparatus of claim 12, wherein the processor is further configured to perform:
prior to identifying, executing an ARP discovery process across the EVPN to populate the local database with ARP entries, including the ARP entry.

14. The apparatus of claim 10, wherein the processor is further configured to perform:

upon determining that the multicast source is not in the EVPN, identifying includes, finding, in a local database, an entry that indicates the next hop PE router serves as a gateway to a layer 3 (L3) network (L3 network) to which the multicast source is connected.

15. The apparatus of claim 14, wherein the processor is further configured to perform, prior to identifying:
upon receiving, from the next hop PE router, an indication that the next hop PE router serves as the gateway to the L3 network, populating the local database with the entry that indicates the next hop PE router serves as the gateway.

16. The apparatus of claim 15, wherein:
receiving, from the next hop PE router, the indication includes receiving, from the next hop PE router, an inclusive multicast Ethernet (IMET) route (IMET route) that includes the indication in an extended community of the IMET route.

17. The apparatus of claim 10, wherein the processor is configured to perform receiving by receiving the multicast join to include an Internet group management protocol (IGMP) join.

18. A non-transitory computer readable medium encoded with instructions that, when executed by a processor of a provider edge (PE) router (PE router) of PE routers of an Ethernet virtual private network (EVPN), cause the processor to perform:

receiving, from a multicast receiver, a multicast join for multicast traffic originated from a multicast source;
identifying a next hop PE router for the multicast source;
generating an EVPN route to the PE router, the EVPN route including a first extended community that is an EVPN instance-route target that identifies the EVPN, and a second extended community that is a specifically targeted route target that identifies the next hop PE router and that is configured to override the EVPN instance-route target to cause only the next hop PE router, and not any other of the PE routers, to import the EVPN route, when the EVPN route is advertised across the EVPN to the PE routers; and
advertising the EVPN route across the EVPN to the PE routers.

19. The non-transitory computer readable medium of claim 18, wherein:
the EVPN route includes an EVPN type-6 selective multicast Ethernet tag (SMET) route.

20. The non-transitory computer readable medium of claim 18, further comprising:
upon determining that the multicast source is in the EVPN, identifying includes, finding, in a local database, an address resolution protocol (ARP) entry that maps the multicast source to the next hop PE router.

* * * * *